Nov. 27, 1962      W. B. MILLS      3,065,927
COMBINATION ROAD AND AIR VEHICLE
Filed Jan. 3, 1962
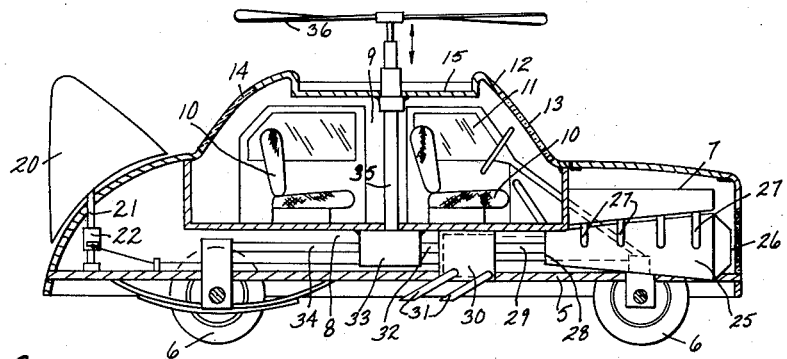
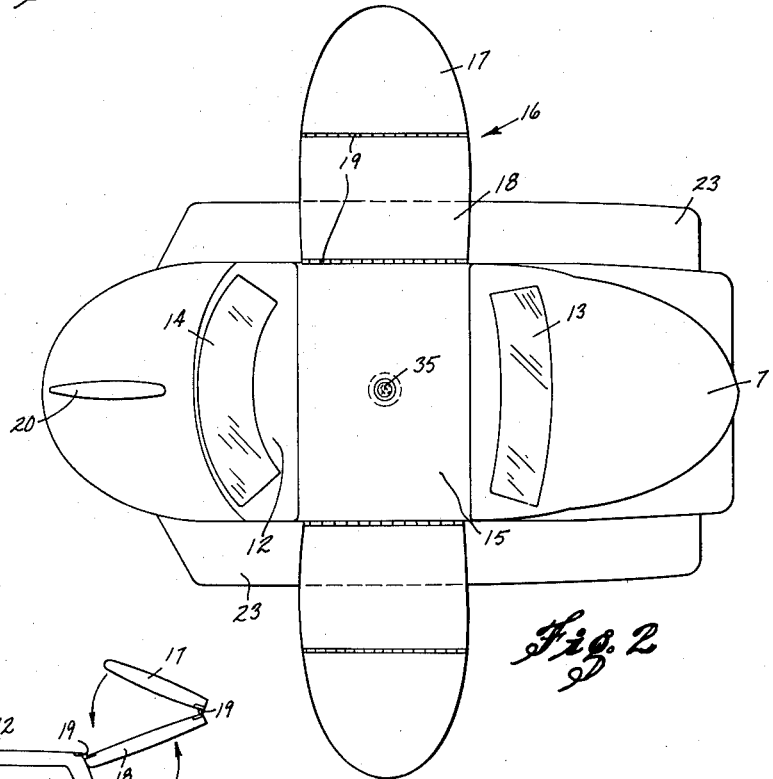
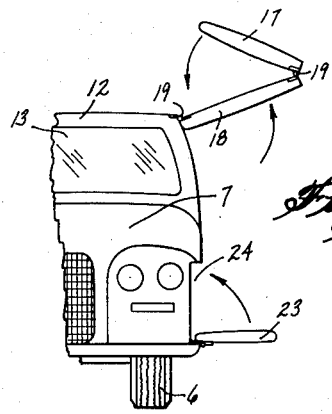
INVENTOR.
Walter B. Mills

United States Patent Office 3,065,927
Patented Nov. 27, 1962

3,065,927
COMBINATION ROAD AND AIR VEHICLE
Walter Beverly Mills, 49 Biggs St., Belleville, Mich.
Filed Jan. 3, 1962, Ser. No. 164,434
3 Claims. (Cl. 244—2)

This invention relates generally to vehicle construction, and more specifically to the design of a vehicle which is operable both on land and in the air.

It is a primary object of this invention to provide a vehicle which is powered by an engine operating on a continuous jet principal for use in travel on the ground and through the air.

It is a further object of this invention to provide a vehicle which incorporates folded wings which may be selectively opened for flight, and a collapsible rotary blade which provides lift for the vehicle when in flight.

It is a still further object of this invention to provide a vehicle of the above class which is simple and economical in design, and is operable with a minimum of control.

Briefly, the invention comprises the provision of a conventionally shaped automobile body in which is mounted an engine operating on a ram jet principle. The exhaust of the jet is directed through a turbine to provide rotational power for the impeller or road wheels, and the reaction of the exhaust gases from the engine are utilized to provide directional motion when in flight.

Further objects and advantages of this invention will become apparent from the following more detailed description of a preferred embodiment thereof, taken in conjunction with the attached drawings wherein:

FIG. 1 is a cross sectional side elevation of the vehicle which comprises my invention.

FIG. 2 is a plan view of the vehicle shown with the wings unfolded in preparation for flight.

FIG. 3 is a fragmentary front elevation of the vehicle showing how the wings may be folded into the roof of the car.

Similar reference characters indicate corresponding parts throughout the several views in the drawings.

Referring now to the drawings in detail, the numeral 5 represents the chassis of the vehicle which is mounted on four wheels 6 for conventional road use. The chassis mounts an engine compartment 7 which extends rearwardly of the vehicle in the form of an enclosed channel 8 disposed centrally of the chassis. A passenger compartment 9 is located centrally of the chassis above the channel 8 and is fitted with conventional seats 10 and access doors 11. The compartment has a roof 12 which incorporates front and rear panoramic windows 13 and 14, disposed in a symmetrical manner at each end of the compartment. A recess 15 is formed centrally of the roof and extends transversely thereacross for the purpose of foldably receiving a pair of wings 16 when not in use.

The wings 16 are formed by two hinged sections 17 and 18 which are secured together by transversely extending hinges 19 mounted on the upper surface of the wing. The hinged sections may be molded one upon the other as indicated in FIG. 3, such that the entire wing may be concealed within the recess 15 when the vehicle is being utilized for road use. A tail fin 20 projects centrally from the rear of the vehicle and is mounted on a vertically projecting shaft 21 which cooperates with a rudder control mechanism 22 operable for steering purposes when in the air. Stabilizer fins 23 are hingedly mounted to each side of the chassis extending along a greater part of its length as indicated in FIG. 2. These fins may be extended horizontally to aid in flight control, and may be folded upwardly into a recess 24 disposed along each side of the vehicle such that the vehicle may be reduced to conventional width when used on the road.

The engine compartment houses a conically shaped combustion chamber 25 which has an intake port 26 disposed at the forward end, and is provided with a number of axially spaced fuel injection ports 27 disposed on the side of the chamber. The chamber communicates with a duct 29 at its smaller end through which the products of combustion are forced for the purpose of operating a small turbine 30 located rearwardly of the engine. Exhaust gases are dispensed through exhaust pipes 31 which project rearwardly and downwardly from the underside of the turbine, and provides the necessary forward propulsion for the vehicle when flying through the air. The turbine drives a shaft 32 which operates a transmission unit 33 for selectively driving the transmission shaft 34 for operating the rear wheels, or a vertically extending impeller shaft 35 which projects through the channel or recess 15 formed in the roof 12 of the vehicle. A multi-bladed impeller 36 is mounted on the end of the shaft 35 and is telescopically received therewithin such that it may be lowered and folded on top of the wing sections when not in use.

Having described the invention in a preferred form, it will be appreciated that some modifications may be made to the precise configuration, without departing from the scope or spirit of the invention, as defined by the following claims.

I claim:

1. A combination road and air vehicle, comprising, a chassis, four wheels supporting the chassis, an engine compartment disposed on the forward end of the chassis and extending rearwardly thereon in the form of a channel, a passenger compartment mounted centrally of the chassis and above the channel, a roof covering the compartment, a recess formed transversely across the top of the roof, wings hingedly mounted to each side of the roof adjacent the ends of the recess, stabilizer fins selectively projecting from the sides of the chassis, an engine mounted in the engine compartment, an impeller disposed above the roof, said engine selectively rotating said impeller and the wheels through a turbine and transmission unit.

2. A combination road and air vehicle according to claim 1, wherein said wings are formed in two sections one folding on the other such that they may be hingedly folded into the recess formed in the roof.

3. A combination road and air vehicle according to claim 2, wherein a tail fin projects vertically from a rear portion of the vehicle, said fin being rotatable on a vertical axis for steering the vehicle when flying.

References Cited in the file of this patent

UNITED STATES PATENTS

| 2,396,419 | Hassel | Mar. 12, 1946 |
| 2,940,688 | Bland | June 14, 1960 |

FOREIGN PATENTS

| 474,003 | Great Britain | Oct. 25, 1937 |
| 935,704 | France | Feb. 9, 1948 |
| 1,236,134 | France | June 7, 1960 |